United States Patent [19]

Freytag et al.

[11] 4,097,333

[45] Jun. 27, 1978

[54] ENZYMATIC METHOD OF PRODUCING GLUCOSE FROM ETHYLENE TREATED CELLULOSE

[75] Inventors: Arthur H. Freytag, Longmont; James C. Linden, Loveland, both of Colo.

[73] Assignee: The Great Western Sugar Company, Denver, Colo.

[21] Appl. No.: 808,812

[22] Filed: Jun. 22, 1977

[51] Int. Cl.[2] .......................... C12D 13/02; C12B 3/06

[52] U.S. Cl. .......................................... 195/33; 195/9; 195/114

[58] Field of Search ........................ 195/9, 33, 114, 10; 127/34, 37, 44; 536/56

[56] References Cited

U.S. PATENT DOCUMENTS

| | | | |
|---|---|---|---|
| 3,642,580 | 2/1972 | Ghose | 195/33 |
| 3,764,475 | 10/1973 | Mandels et al. | 195/33 |
| 3,925,097 | 12/1975 | Freytag et al. | 127/44 |
| 3,972,775 | 8/1976 | Wilke | 195/33 |

*Primary Examiner*—Raymond N. Jones
*Assistant Examiner*—Thomas G. Wiseman
*Attorney, Agent, or Firm*—Bruce G. Klaas; Dennis K. Shelton

[57] ABSTRACT

Glucose yields in the enzymatic hydrolysis of cellulose to glucose are significantly enhanced by treating cellulosic material with ethylene either prior to and/or during the hydrolytic reaction.

9 Claims, 4 Drawing Figures

ENZYMATIC METHOD OF PRODUCING GLUCOSE FROM ETHYLENE TREATED CELLULOSE

BACKGROUND OF THE INVENTION

1. Field of the Invention

This invention relates to the enzymatic hydrolysis of cellulose to glucose and specifically to a method of increasing the yield of glucose production by conducting enzymatic hydrolysis of cellulosic material in the presence of ethylene and/or pretreating the cellulosic material with ethylene prior to hydrolysis.

2. Description of the Prior Art

Cellulose is a naturally produced carbohydrate occurring widely in plant life, in which it functions as the structural framework of plants. Natural sources vary widely in their cellulose content, with most woods containing approximately 40 to 50 percent cellulose and some sources, such as cotton containing 90 percent cellulose or more. Pure cellulose is a linear polymer composed of β-glucosidic units which undergoes enzymatic hydrolysis in the presence of cellulase to form glucose. Actual realized conversion of cellulose to glucose in the hydrolytic process is relatively low, however, probably due to the stranded and crystalline structure of cellulose.

it is now been found that glucose yields in the hydrolytic conversion of cellulose to glucose can be significantly enhanced by treating cellulosic material with ethylene either prior to and/or during the hydrolytic reaction.

DESCRIPTION OF THE PREFERRED EMBODIMENTS

Figure 1:
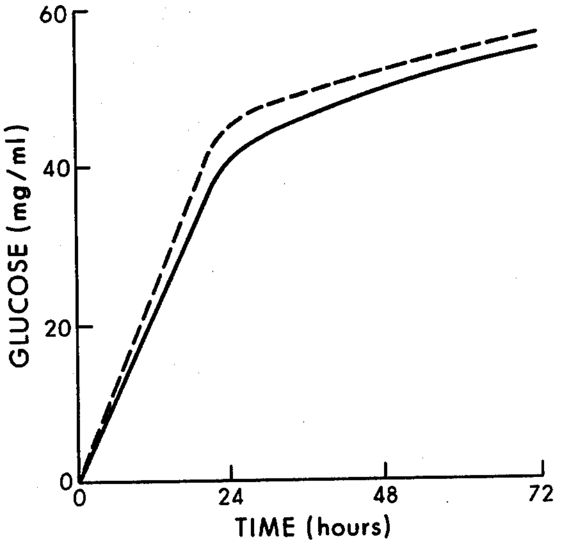
FIG. 1 is a graphic representation of the effects of ethylene and NaOH pretreatments on cellulose to glucose conversion of filter paper cellulosic material.

In accordance with the present invention, cellulosic material is hydrolyzed to glucose and other by-products through the enzymatic action of cellulase. Cellulases suitable for this purpose may be derived from commonly known cellulose degrading micro-organisms such as *Aspergillus niger, Clostridium thermocellum, Stachybotrys atra, Polyporus tulipferae, Ruminococcus sp., Cellvibrio gilvus, Aspergillus fumigatus,* etc.

Any cellulose containing materials may be hydrolyzed according to the present invention. In order to enhance the conversion of cellulose to glucose and other by-products, it is preferable to mill the cellulosic material to a relatively small size, e.g., from about 50 to about 200 mesh, more preferably from about 75 to about 150 mesh and most preferably from about 100 to about 125 mesh, by means of conventional milling apparatus. Additionaly, if the cellulosic material contains a significant amount of lignin, such as in wood cellulose, it is preferable to subject the material to a lignin degrading pretreatment to reduce lignin bonding prior to hydrolysis. This may be accomplished by conventionally pretreating the cellulosic material with a suitable acid, such as sulfuric or phosphoric acid, or with a suitable base, such as sodium hydroxide.

A hydrolysis mixture is formulated comprising the cellulosic material, cellulase and water. If the cellulase is produced in the mixture by cellulase producing micro organisms, then the mixture will further comprise a suitable conventional amount of nutrient materials. For best results, a sufficient amount of water is added to the mixture to effectively disperse the cellulosic material throughout the mixture. The amount of cellulase added to the mixture can vary widely, but is preferably a sufficient amount to hydrolyze at least a portion of the cellulosic material.

Additionally, the mixture is treated with a sufficient amount of ethylene to enhance the hydrolysis reaction either prior to hydrolysis, as a pretreatment, and/or during the hydrolysis reaction. As a pretreatment, ethylene gas may be bubbled through the mixture of the cellulosic material and the water, at a rate preferably greater than about 1cc/min./1000ml of mixture, more preferably greater than about 1cc/min./500ml of mixture, and most preferably greater than about 1cc/min./100ml of mixture, or the mixture may be formulated by adding cellulosic material to an ethylene saturated aqueous solution. The cellulosic material is preferably exposed to the ethylene for at least one hour prior to the addition of cellulase. When the ethylene treatment occurs during hydrolysis, ethylene gas is preferably bubbled through the hydrolysis mixture in the same manner as during pretreatment. Alternatively, the ethylene treatment may occur both as a pretreatment and during hydrolysis.

The hyrolysis reaction is then carried out in a conventional manner. For optimum results, the temperature of the hydrolysis mixture is maintained at about 20 to about 60° C, preferably about 40° to about 55° C, and the pH of the hydrolysis mixture is maintained, with the use of a suitable buffer, at or near an optimum level for the particular cellulase used, e.g., at about 3.5 to about 7.0, preferably about 4.0 to about 5.5, during the hydrolysis reaction.

The foregoing description of the inventive concepts will be more fully understood in association with the following illustrative examples.

EXAMPLE I

Two aqueous dispersions of cellulosic materials are prepared by grinding for each 0.5 gm of Whatman No. 114 filter paper in a Wiley Mill and adding the ground paper to 50 ml of distilled water containing a sufficient amount of NaOH to make the dispersions 2N in NaOH. The dispersions are then boiled for one hour. After cooling to 50° C, 5 ml of 0.1 M acetate buffer (pH = 4.5) and 5mg of Rhizopus Type III Crude Cellulase (E.C. 3.2.14 practical grade, Sigma Chemical Co., Lot No. 67627) are added to each dispersion and the mixtures are incubated at 50° C on a shaking water bath. During incubation, ethylene gas is sparged through one of the mixtures at the rate of 1cc/min. On the first, second and third days following initiation, 10 ml samples are taken from each mixture and the samples are filtered, frozen and analyzed for glucose by increase in reducing value as detemined by the method of Nelson,

*Journal of Biological Chemistry,* Vol. 153, p. 375 (1944). The effect of the presence of ethylene gas during hydrolysis on the conversion of cellulose to glucose is shown in FIG. 1, in which the dashed line represents glucose production in the ethylene treated mixture and the solid line represents glucose production in the control mixture. Higher levels of glucose in the supernatant are readily apparent in the ethylene treated hydrolysis mixture with glucose production being increased over the conventional hydrolysis mixture by about 9% after 24 hours of incubation.

EXAMPLE II

Figure 2:
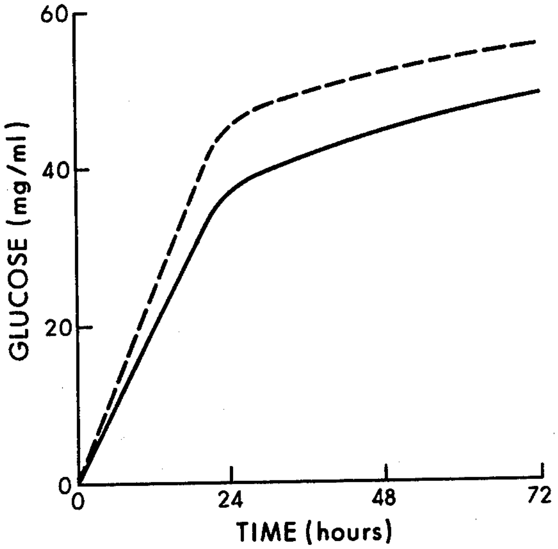
FIG. 2 is a graphic representation of the effects of conducting cellulose hydrolysis of filter paper cellulosic material in the presence of ethylene.

The procedure of Example I is repeated except with additionaly sparging ethylene gas through the mixture during pretreatment. As shown in FIG. 2 in which the dashed line represents glucose production in the mixture receiving ethylene treatment during hydrolysis and the solid line represents ethylene production in the conventionally incubated mixture, the presence of ethylene gas during hydrolysis in the ethylene and NaOH pretreated cellulose results in an increase of glucose in the supernatant of about 19% after 24 hours of incubation over the mixture which is pretreated with ethylene and NaOH and then conventionally incubated.

EXAMPLE III

Figure 3:
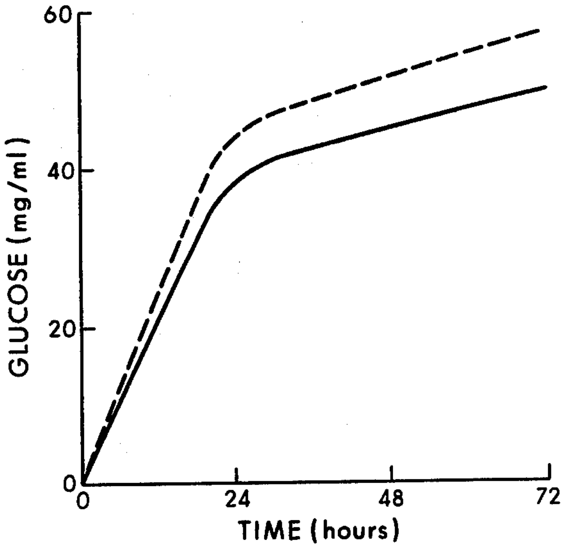
FIG. 3 is a graphic representation of the effects of conducting cellulose hydrolysis of milled dried beet pulp cellulosic material in the presence of ethylene.

The procedure of Example II is repeated except without the addition of NaOH to the hydrolysis mixture during pretreatment. As shown in FIG. 3 in which the dashed line represents glucose production in the mixture receiving ethylene treatment during hydrolysis and the solid line represents ethylene production in the conventionally incubated mixture, the presence of ethylene gas during hydrolysis of the ethylene pretreated cellulose results in an increase in glucose in the supernatant of about 12% after 24 hours of incubation over the mixture which is pretreated and then conventionally incubated.

EXAMPLE IV

The procedure of Example I is repeated except that the mixtures are placed into compartmentalized fermentation vessels having the mixtures in a first compartment of the vessel and an equal volume of 0.1 M acetate buffer (pH 4.5) in a second comartment of the vessel, the first compartment being separated from the second compartment by a 0.45 micron Metrical 25mm filter in a Millipore filter holder to allow glucose to migrate through the filter into the second compartment. The effect of the presence of ethylene gas on hydrolysis with glucose removal by diffusion is shown in Table I.

TABLE I

| Ethylene Present During Hydrolysis | Time (Hours From Initiation | Mg/ml Reducing Sugar In Supernatant | | |
|---|---|---|---|---|
| | | First Compartment | Second Compartment | Total |
| No | 24 | 24.5 | 3.4 | 27.9 |
| No | 48 | 17.7 | 8.2 | 25.9 |
| No | 72 | 15.7 | 10.2 | 25.9 |
| Yes | 24 | 20.0 | 5.2 | 25.2 |
| Yes | 48 | 16.2 | 11.2 | 27.4 |
| Yes | 72 | 15.0 | 13.0 | 28.0 |

As shown in Table I, the production of reducing sugar is significantly enhanced by sparging ethylene gas through the mixture during hydrolysis.

EXAMPLE V

Figure 4:
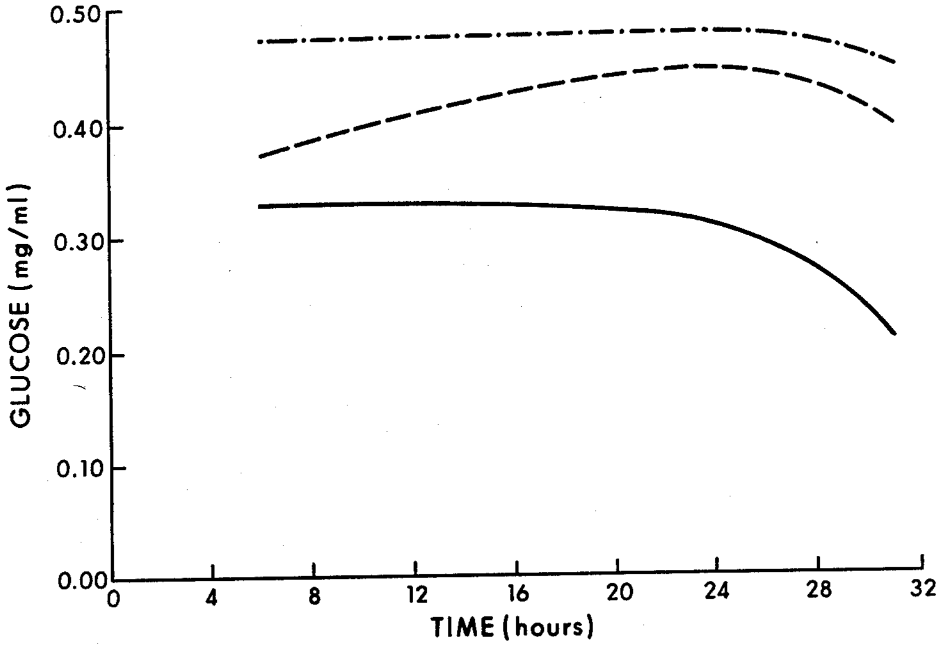
FIG. 4 is a graphic representation of the effects of ethylene and NaOH pretreatments on cellulose to glucose conversion of milled dried sugar beet pulp cellulosic material.

Three mixtures are prepared containing 25 g of ground, dried sugar beet pulp (molasses free) suspended in 700ml of distilled water. To two of the mixtures is added 21.0 mg of practical grade *Aspergillus niger* Type II cellulase (Sigma Chemical Co., Lot No. C7502). The pH is adjusted to 4.5 in all three mixtures and the mixtures are incubated at room temperature on a rotary shaker. Ethylene gas is sparged through one of the mixtures containing cellulase during hydrolysis. Samples are taken at 6, 24 and 31 hours following initiation, filtered and analyzed by polarimetry and for reducing sugar value by the method of Nelson. The effect of cellulase and cellulase plus ethylene during hydrolysis on the glucose content of the supernatant of the samples is shown in Table II and in FIG. 4 in which the alternately dashed and dotted line represents glucose production in mixture containing cellulose which is treated with ethylene, the dashed line represents glucose production in the mixture containing cellulose without ethylene treatment and the solid line represents glucose production in the mixture which neither contains added cellulase nor is treated with ethylene.

TABLE II

| | TIME FROM INITIATION (HOURS) | | |
|---|---|---|---|
| | 6 | 24 | 31 |
| CONTROL: | | | |
| pH: | 4.5 | 5.2 | 5.3 |
| Pol.: | 2.9 | 2.8 | 3.0 |
| Mg Glucose/ml: | 0.33 | 0.31 | 0.21 |
| CELLULASE: | | | |
| pH: | 4.5 | 4.8 | 5.2 |
| Pol.: | 3.2 | 3.4 | 4.4 |
| Mg Glucose/ml: | 0.37 | 0.45 | 0.40 |
| CELLULASE AND ETHYLENE: | | | |
| pH: | 4.5 | 4.8 | 5.0 |
| Pol.: | 3.4 | 4.0 | 4.6 |
| Mg Glucose/ml: | 0.47 | 0.48 | 0.45 |

In addition, paper chromatographic analysis of samples taken at 6, 24 and 31 hours after initiation show that the ratio of glucose to oligosaccharides increases with time and the rate of increase experienced in the mixture comprising cellulase and ethylene is greater than that experienced in the control mixture or in the mixture comprising cellulase but without ethylene.

EXAMPLE VI

Three dispersions of cellulosic material are prepared by coarse grinding 1500g of dried beet pulp (molasses free) and adding 500g of the ground pulp to each of three 5.5 liter samples of water. The dispersions are pretreated by adding to two of the samples 11.0g of NaOH and stirring the dispersions at 500rpm for two hours at 23° C. To one of the dispersions containing NaOH, ethylene gas is sparged through the dispersion at 100cc/min. during pretreatment. At the end of 2 hours, the wet pulp is hand squeezed in a cloth towel, dewatered in an Acme Juicerator and dried in a tray dryer for about 12 hours. The dried pulp is then finely milled in a Wiley mill and classified on U.S. equivalent mesh screens. From the classified ground pulp 0.25g samples of 100 mesh size are taken from each of the three separately pretreated pulp batches, and are each added to an aqueous solution containing 5.0ml of 0.1M acetate buffer at pH 4.5 and 50ml of distilled water. The aqueous solutions are then sterilized by autoclaving. Aqueous solutions of cellulase are prepared by adding 0.5g of practical grade *Aspergillus niger,* Type II cellulase (Sigma Chemical Co., Lot No. C7502) to 10ml of sterile 0.1M acetate buffer at pH 4.5. Using sterile pipettes, 1.0ml of the cellulase solution is added to each of the pulp samples, the samples are heated to 50° C and allowed to incubate with gentle agitation. After 1, 26 and 44 hours, 1.0ml aliquots are aseptically removed from the hydrolysis mixture, filtered through a 0.45 micron Millipore filter and frozen. The samples are thawed and analyzed for reducing sugar using the p-hydroxybenzoic acid hydrazide method of Lever, Anal. Biochem., Vol. 47, pp. 273–279 (1972). The reducing sugar content in the supernatant of the various samples is shown in Table III.

TABLE III

EFFECT OF PRETREATMENT ON CELLULASE HYDROLYSIS OF SUGAR BEET PULP

| | Reducing Sugar in Supernatant (mg/ml) | | |
|---|---|---|---|
| | TIME AFTER INITIATION (HOURS) | | |
| PRETREATMENT | 1 | 26 | 44 |
| Control | 7.3 | 8.8 | 13.6 |
| NaOH | 7.1 | 8.5 | 12.5 |
| NaOH + Ethylene | 7.3 | 11.6 | 15.3 |

As shown in Table III, NaOH pretreatment alone has little effect on reducing sugar production. However, pretreatment with NaOH and ethylene enhances glucose released by about 26 percent after 44 hours.

While the foregoing presents illustrative embodiments of the inventive concepts, certain modifications will be apparent to a person skilled in the art. Such modifications are intended to be included within the scope of the appended claims.

What is claimed is:

1. A method of producing glucose through the enzymatic hydrolysis of cellulosic material, comprising contacting the cellulosic material with a sufficient amount of ethylene to enhance the production of glucose and hydrolyzing at least a portion of the cellulosic material to glucose in the presence of cellulose.

2. The method of claim 1 wherein the cellulosic material is contacted with ethylene prior to hydrolysis of the cellulosic material to glucose.

3. The method of claim 2 wherein the cellulosic material is dispersed in water and ethylene gas is bubbled through the dispersion to contact the cellulosic material.

4. The method of claim 3 wherein the ethylene gas is bubbled through the dispersion at a rate greater than about 1cc/minute/1000ml of dispersion.

5. The method of claim 2 wherein the cellulosic material is dispersed in an aqueous solution of ethylene to contact the cellulosic material with ethylene.

6. The method of claim 1 wherein the cellulosic material is contacted with ethylene during hydrolysis of the cellulosic material to glucose.

7. The method of claim 6 wherein the cellulosic material is dispersed in water and ethylene gas is bubbled through the dispersion to contact the cellulosic material.

8. The method of claim 7 wherein the ethylene gas is bubbled through the dispersion at a rate greater than about 1cc/minute/1000ml of dispersion.

9. The method of claim 1 in which lignin is associated with the cellulosic material and which further comprises degrading a substantial portion of the lignin prior to hydrolysis of the cellulosic material to glucose.

* * * * *

UNITED STATES PATENT AND TRADEMARK OFFICE

CERTIFICATE OF CORRECTION

PATENT NO. : 4,097,333

DATED : June 27, 1978

INVENTOR(S) : Arthur H. Freytag and James C. Linden

It is certified that error appears in the above-identified patent and that said Letters Patent are hereby corrected as shown below:

Claim 1, line 6 should read "to glucose in the presence of cellulase."

Signed and Sealed this

*Seventh* Day of *November 1978*

[SEAL]

*Attest:*

RUTH C. MASON
*Attesting Officer*

DONALD W. BANNER
*Commissioner of Patents and Trademarks*